United States Patent
Schroter et al.

(10) Patent No.: US 6,828,783 B2
(45) Date of Patent: Dec. 7, 2004

(54) ANGLE MEASURING INSTRUMENT FOR A ROTATING SHAFT

(75) Inventors: Andreas Schroter, Traunstein (DE); Marc Tiemann, Nussdorf (DE); Johann Oberhauser, Vachendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/295,801

(22) Filed: Nov. 15, 2002

(65) Prior Publication Data

US 2003/0093907 A1 May 22, 2003

(30) Foreign Application Priority Data

Nov. 16, 2001 (DE) ......................................... 101 58 223

(51) Int. Cl.[7] .............................. G01B 7/30; G01P 3/44
(52) U.S. Cl. .............................. 324/207.25; 324/207.17; 324/173; 33/1 PT; 341/15
(58) Field of Search ................................. 33/1 PT, 1 N, 33/534, 706; 341/15, 115; 324/207.12, 207.17–207.19, 207.22–207.25, 173, 174

(56) References Cited

U.S. PATENT DOCUMENTS 6,111,402 A  8/2000  Fischer .................. 324/207.17
6,542,088 B1 * 4/2003  Bielski et al. ................. 341/15
6,563,443 B2 * 5/2003  Oberhauser .................. 341/115

FOREIGN PATENT DOCUMENTS

| DE | 28 17 172  | 5/1986 |
| DE | 197 51 853 | 6/1998 |
| DE | 196 26 654 | 5/2001 |
| EP | 0 845 659  | 6/1998 |

* cited by examiner

*Primary Examiner*—Jay Patidar
(74) *Attorney, Agent, or Firm*—Kenyon & Kenyon

(57) ABSTRACT

An angle measuring instrument having a device for determining a shaft angular position within one shaft rotation, and a device for determining a number of executed shaft rotations having a gear including at least one gear for converting the shaft rotary motion into rotary motion having a defined reduction ratio. The gear unit includes at least one gear wheel which rotates in a defined ratio to the shaft rotary motion. Devices are provided for generating sensor signals which are positionally dependent and are dependent upon the shaft rotations, in which the detecting device inductively scans reduced rotational movements of the shaft, and has alternating electrically conductive and electrically non-conductive graduation regions and a scanning device, movable relative to the graduation structure, including a device for generating a homogeneous electromagnetic field and a sensor device to scan the graduation structure and to transmit sensor signals which are dependent upon the shaft rotations.

79 Claims, 6 Drawing Sheets

ANGLE MEASURING INSTRUMENT FOR A ROTATING SHAFT

CROSS-REFERENCE TO RELATED APPLICATIONS

The present application claims priority to Application No. 101 58 223.4, filed on Nov. 16, 2001 in the Federal Republic of Germany, which is expressly incorporated herein in its entirety by reference thereto.

FIELD OF THE INVENTION

The present invention is directed to an angle measuring instrument.

BACKGROUND INFORMATION

Angle measuring instruments are used to measure both the angle of rotation of a rotating shaft within one rotation, as well as the number of rotations executed by the rotating shaft, so that, by combining the two measuring results, the absolute position of the rotating shaft can be determined even after several rotations have occurred.

For example, a single-turn rotary position transducer is used to measure the angle of rotation of a rotating shaft within one rotation. When configured as a rotary encoder, the transducer allows both an angular measurement to be taken in incremental measuring steps at the rotating shaft, as well as an absolute angle determination to be made within one single shaft rotation.

To determine the number of shaft rotations that have occurred, multiturn rotary encoders are used to determine the absolute angular position within one shaft rotation, i.e., between 0° and 360°, via an encoder disk (a disk containing a coded pattern) which is connected to the shaft and which is scanned with the aid of a suitable photoelectric scanning unit. To obtain the required information regarding the number of effected shaft rotations, typically a reduction or step-down gear is provided, by way of which, with a rotating shaft, the one or more partial disks or encoder disks is/are set into a rotary motion at a low number of revolutions per unit of time, i.e., a slow speed. The rotational movements of the additional encoder disks are likewise measured using one or more photoelectric scanning units, so that, on the basis of the known reduction of the rotary motion of the additional encoders disks, the number of executed shaft rotations can be determined. It is also possible to measure the absolute position of the rotating shaft over a plurality of rotations.

From German Published Patent Application No. 28 17 172, partial disks coupled to gear wheels may be photoelectrically scanned. In this multi-stage incremental shaft encoder, a first encoder disk is provided concentrically to the shaft, and the other succeeding encoder disks are configured in a common plane. The encoder disks are scanned photoelectrically such that the receivers are located on the side of a board facing the encoder disks, and the receivers on another board fixed to the housing.

Since the process of photoelectrically scanning a plurality of partial disks using one photoelectric scanning device, as the case may be, is expensive and susceptible to contamination, such that it can only be carried out under appropriate ambient conditions or by properly encapsulating the measuring device, to reduce the outlay for components, German Published Patent Application No. 196 26 654 describes measuring the rotary motion of gear wheels using strain-sensing elements, which are in a positive contact with the particular gear wheel. In contrast to the spatial configuration of the reduction gear or of the individual gear wheels in a common plane, as described German Published Patent Application No. 28 17 172, in the system illustrated in German Published Patent Application No. 196 26 654, the individual gear wheels are staggered in the axial direction.

It is therefore an object of the present invention to provide an angle measuring instrument of the type set forth at the outset, which will enable the number of executed shaft rotations to be simply determined, which is insensitive to contamination, is suited for simple and high-resolution scanning operations, and which allows a plurality of specific configuration embodiments having different space requirements.

SUMMARY

The above and other beneficial objects of the present invention are achieved by providing a measuring instrument as described herein.

An angle measuring instrument according to the present invention includes a simple configuration and a functioning that is insensitive to contamination, which renders possible a plurality of exemplary embodiments having different space requirements, and which is equally suited for a simple as well as for a high-resolution acquisition of the number of executed shaft rotations.

German Published Patent Application No. 197 51 853 describes the principle of inductive scanning for a device for determining the absolute angular position of a rotating shaft within one shaft rotation, i.e., for a pure single-turn rotary position transducer. However, no reference to applying this principle to a multiturn rotary position transducer can be inferred from this publication.

The present invention achieves the objective by starting out from a fundamental consideration that, given a suitable designed multiturn rotary position transducer, the principle of inductive or capacitive scanning may be applied, while attaining the associated advantage of insensitivity to contamination and a rugged, economical type of construction, even in the case of a multiturn rotary position transducer. In particular, a multiturn rotary position transducer which functions in accordance with the inductive or capacitive scanning principle to determine both the absolute angular position of a rotating shaft within one shaft rotation, as well as to determine the number of executed shaft rotations, may be combined with a single-turn rotary position transducer which functions in accordance with the principle of inductive or capacitive scanning.

In the various exemplary embodiments of the approach according in the present invention, the multiturn rotary position transducer, which functions in accordance with the inductive or capacitive scanning principle, may also be combined with any other single-turn rotary position transducers, which work, for example, according to the photoelectric or magneto-resistive scanning principle, without affecting the advantage of a simple design and of insensitivity to contamination of the multiturn rotary position transducer which works in accordance with the inductive or capacitive scanning principle.

The sensor device of the multiturn rotary position transducer, which works according to the inductive or capacitive scanning principle, may include at least one sensor track having at least two sensor windings, which are phase-shifted with respect to one another and which emit phase-offset, periodically modulated sensor signals in response to the relative motion between the scanning device and the graduation structure, while the device for generating an electromagnetic excitation field has exciter elements positioned on both sides of the sensor track which produce the most homogeneous possible electromagnetic field in the region of the sensor track.

The exciter elements may include a current-carrying conductive track or of a plurality of current-carrying conductive tracks disposed in parallel to one another, the conductive tracks of the exciter elements being interconnected such that the current flow is oriented in opposite directions in the conductive tracks positioned on both sides of the sensor track. In this context, the graduation structure may be placed on a circular graduation board and include a first, circularly formed graduation track, made up of an electrically conductive circular segment and an electrically non-conductive circular segment. The scanning device may include a scanning structure which is positioned on a circular scanning board and may have a sensor device which has the sensor track assigned to the graduation track, the sensor windings of the sensor track allowing an absolute positional determination over the detectable measuring range.

At least one graduation and one inductive scanning, including a sine and cosine graduation track, may be assigned to each gear unit, so that the angular information relevant to the gear unit in question may be acquired for each gear unit by performing an arctan calculation.

To increase accuracy, the graduation indicative of a shaft rotation may also have assigned to it a fine graduation in the form of an incremental graduation track, in that the graduation structure is provided with a second circularly formed graduation track, which is radially adjacent to the first graduation track and is formed as a periodic sequence of a plurality of electrically conductive graduation regions and electrically non-conductive graduation regions, the corresponding scanning device having a scanning structure, which has a sensor device having a second sensor track 80 (FIG. 2) which is assigned to the second graduation track 41 and in which sensor windings $SW_C$, $SW_D$ (FIG. 2) are arranged to enable an additional, incremental positional determination.

A divided circle-shaped graduation structure is formed on a copper-coated graduation board, a structurally patterned metal disk, or on a partially metallized plastic part, in particular on a metallized gear wheel.

The device for determining the absolute angular position of a rotating shaft within one shaft rotation includes a detecting device having a graduation structure positioned on a graduation board and a scanning device mounted on a scanning board for transmitting output signals which are dependent upon the absolute angular position of the rotating shaft within one shaft rotation. The output signals of the device for determining the absolute angular position of the rotating shaft within one shaft rotation and the sensor signals of the device for determining the number of executed shaft rotations are transmitted to an evaluation unit.

The graduation and scanning device of the single-turn rotary position transducer, i.e., the device for determining the absolute angular position of a rotating shaft within one shaft rotation, and the evaluation board of the evaluation unit are positioned coaxially with respect to the shaft. However, the graduation and scanning devices of the single-turn rotary position transducer and of the multiturn rotary position transducer may be axially allocated in a different manner.

In a first exemplary embodiment, the graduation and the scanning devices of the single-turn rotary position transducer may be positioned on one side of the evaluation unit, and the graduation and scanning devices of the multiturn rotary position transducer on the other side of the evaluation unit, while in a second exemplary embodiment, the scanning device of the single-turn rotary position transducer and the scanning device of the multiturn rotary position transducer are positioned on both sides of a common scanning board, opposite the corresponding graduation devices assigned to the scanning devices.

In another exemplary embodiment, where a scanning board common to the single-turn rotary position transducer and the multiturn rotary position transducer supports the multiturn scanning on one side and the single-turn scanning, on the other side, only a one-time contacting between the evaluation board and the common scanning board is necessary, so that the requirements for an inexpensive angle measuring instrument are met.

Instead of configuring the graduation and scanning structures on printed-circuit boards or boards, the graduation structure may be placed on the peripheral surface of a cylindrical member and have a first graduation track made up of an electrically conductive and an electrically non-conductive peripheral cylinder section, while the scanning device has a scanning structure which is placed on a cylindrical housing and which has a sensor device having a sensor track which is assigned to the graduation structure and which has sensor windings wound on the peripheral cylinder surface which are configured to enable an absolute positional determination over the detectable measuring range.

In this exemplary embodiment, the graduation structure may have a second graduation track which is axially adjacent to the first graduation track and which is formed as a periodic sequence of a plurality of electrically conductive graduations regions and electrically non-conductive graduation regions, and the scanning device may include a scanning structure which is positioned on the cylindrical housing and which has a sensor device having a second sensor track 80 (FIG. 2), which is assigned to the graduation structure and which has sensor windings $EW_3$ (FIG. 2) wound on the peripheral cylinder track surface which are configured to enable an additional incremental positional determination via sensor windings $SW_C$, $SW_D$. The windings may be applied in a spatial form directly in a plastic gear housing, and the graduation may be configured in a planar or cylindrical form. In particular, the windings may be placed on a flexible conductor which is secured, for example by bonding, to the peripheral surface of the cylindrical housing, radially encircling the same.

In so-called drum divisions, the scanning is no longer sensitive to changes in the distance between the graduation device and the scanning device.

The graduation structure may be formed on a copper-coated cylindrical member, a structurally patterned metal cylinder, or on the surface or peripheral area of a partially metallized plastic part, in particular on a metallized gear wheel.

The dimensional example embodiment of the graduation structure may be fabricated using the two-component injection-molding process, the injection-molding process including inserts, or by coating a substructure. Alternatively, the dimensional embodiment may be formed on a substructure completely made of metal or of a conductive plastic, the division being formed by height gradations, recesses, holes, etc.

The device for determining the number of executed shaft rotations may have a plurality of gear units for the defined reduction of the rotational movements of the shaft, the exciter elements of the multiturn rotary position transducer receiving the excitation signals which are assigned to the gear units and which are modulated to a carrier frequency, while the exciter elements of the single-turn rotary position transducer are fed excitation signals which are modulated to a carrier frequency which differs by a predefinable frequency difference from the carrier frequency that is applied to the exciter elements of the multiturn rotary position transducer.

The exciter elements may be assigned to the gear units which are fed by a common exciter resonant circuit.

By selecting different carrier frequencies for the single-turn rotary position transducer and the multiturn rotary position transducer, an unwanted mutual influencing of the excitation coils is prevented. The difference between the carrier frequencies may be such that the mutual influences are negligible following a band-pass filtering.

Instead of one evaluation unit for each gear unit, the scanning devices of the individual gear units may be connected via a multiplex device to a common evaluation unit, so that the multiturn scanning devices assigned to the individual gear units are evaluated one after another via the multiplex device, by the same electronics.

In particular, two high-frequency modulated sensor signals, which are 90° out-of-phase, may be amplified, filtered, and demodulated by the multiturn scanning devices assigned to the gear units, and the resulting low-frequency sensor signals may be amplified and sent via an analog/digital converter to a device for calculating positional values, which sends an encoded output signal to a display device and/or follow-up electronics.

To achieve sufficiently accurate sensor signals, in place of a fine signal adjustment in the device for calculating positional values, an adjustment may be undertaken using a table of correction values. Here it suffices to have a table of correction values which may be stored in a memory chip and be taken into consideration when the angle calculations are made for the particular gear unit.

In addition, it is possible for the evaluation unit of the single-turn and multiturn rotary position transducer to be integrated in an application-specific, integrated circuit (ASIC). By properly configuring the relevant interfaces, the multiturn rotary position transducer based on the inductive scanning principle may be optionally combined with an optical, magnetic or inductive single-turn rotary position transducer.

DETAILED DESCRIPTION

Figure 1:
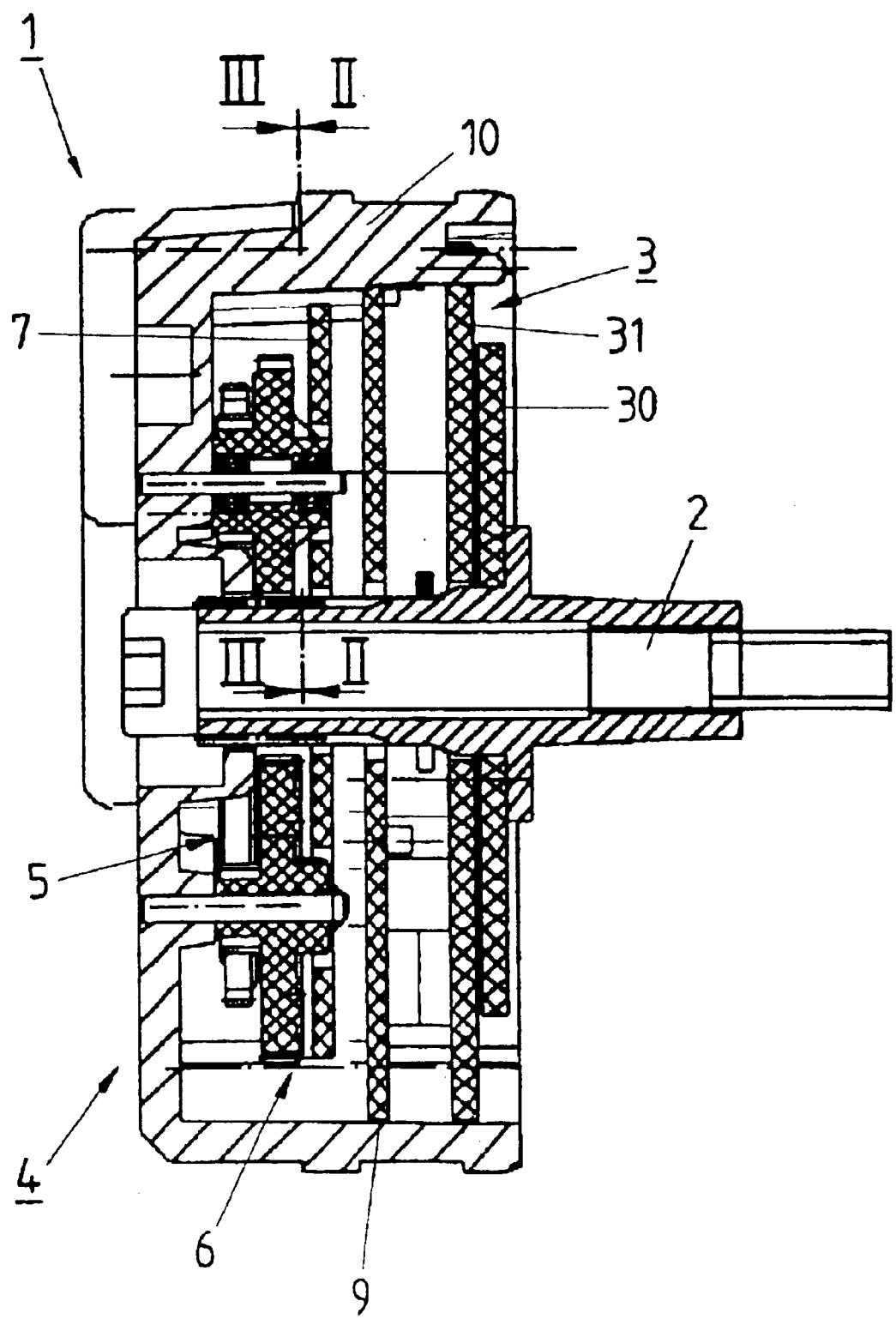
FIG. 1 is a cross-sectional view through an angle measuring instrument including inductive single-turn and multiturn scanning devices positioned on separate scanning boards.

FIG. 1 is a cross-sectional view through an angle measuring instrument 1 having a device for determining an absolute angular position of a rotating shaft 2 within one shaft rotation (single-turn rotary position transducer 3) and a device for determining a number of executed shaft rotations (multiturn rotary position transducer 4), which are mounted in a cylindrical measuring-unit housing 10, which is joined to the stationary drive part into which projects rotating shaft 2 which is connected to a rotating drive part, in which an angular position within one shaft rotation and a number of executed shaft rotations is to be determined.

Single-turn rotary position transducer 3 includes a graduation device 30, which is mounted on a graduation board connected to rotating shaft 30, and a stationary scanning device 31, which is provided on a scanning board joined to measuring-unit housing 10. Positioned on the graduation or rotor board secured to rotating shaft 2 are, for example, two radially adjacent, circularly formed graduation tracks, which are made up of a periodic sequence of alternately configured electrically conductive graduation regions and electrically non-conductive graduation regions.

Single-turn scanning device 31 provided for scanning the graduation tracks of graduation device 30 has scanning or sensor tracks which are assigned to the graduation tracks and which are circularly formed and positioned so as to be radially adjacent on the scanning board. Besides the scanning tracks, single-turn scanning device 31 has exciter elements which generate, for example, a homogeneous electromagnetic excitation field in the area of the scanning tracks.

The configuration and function of the graduation tracks positioned on the rotor board, as well as of the scanning tracks and exciter elements positioned on the single-turn scanning board may be arranged, for example, in accordance with German Published Patent Application No. 197 51 853, as well as a different form, for example as opto-electronic or magneto-resistive single-turn scanning.

Multi-turn rotary position transducer 4 is composed of a gear 5 having a plurality of gear units for converting the rotation of rotating shaft 2 having a defined reduction or step-down ratio and of a detecting device 6, which inductively scans the reduced or stepped-down rotational movements of rotating shaft 2.

The exemplary embodiment of an angle measuring instrument illustrated in FIG. 1 includes a reduction gear having three gear units configured in one plane. The three gear units include intermeshing gear wheels, of which one gear wheel in each gear unit is reduced in a known ratio to the rotary motion of rotating shaft 2, i.e., rotates at a defined speed that is reduced relative to rotating shaft 2. In dependence upon the selected reduction ratio, the gear wheel of the first gear unit coupled to detecting device 6 rotates at a known rotational speed that is reduced in comparison to the rotational speed of rotating shaft 2, while the two further gear units, which are adjacent in parallel and connected to the first gear unit, with their gear wheels assigned to detecting device 6, again specifically reduce or step down the rotary motion of rotating shaft 2.

Thus, by acquiring the rotary motion of the gear wheels of the three gear units assigned to multiturn detecting device 6, unique ascertainment of the number of executed shaft rotations of shaft 2 is possible.

Figure 2:
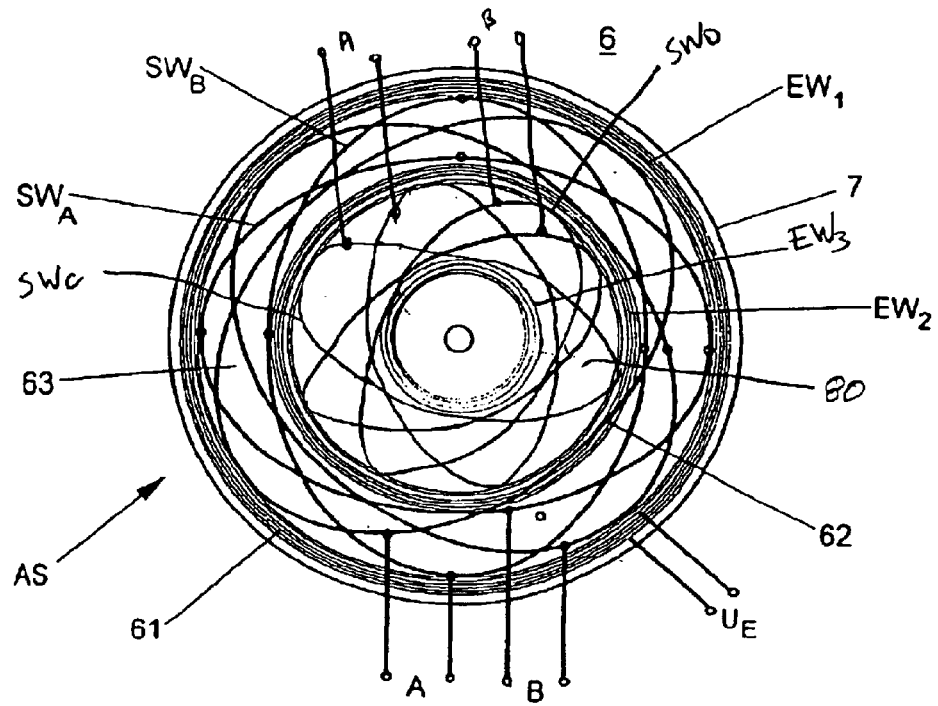
FIG. 2 is a plan view of the multiturn scanning device taken along the line II—II illustrated in FIG. 1.
Figure 3:
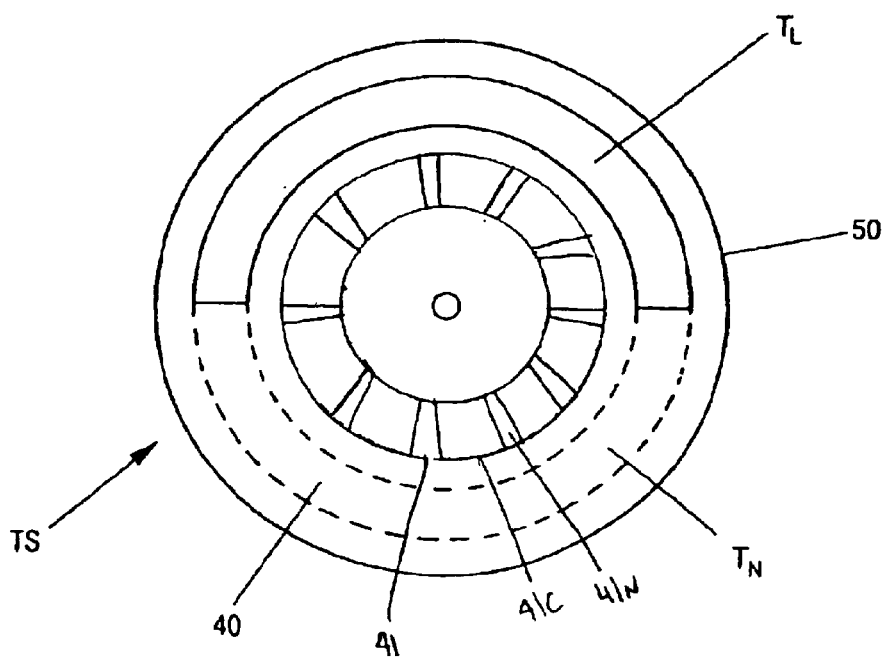
FIG. 3 is a plan view of the multiturn graduation structure taken along the line III—III illustrated in FIG. 1.

The configuration and function of detecting device 6 of multiturn rotary-position transducer 4 is clarified on the basis of FIGS. 2 and 3, which illustrate partial views of the section of in FIG. 1, through an angle measuring instrument 1, taken along lines II—II as well as III—III.

In this context, FIG. 2 is a view of a portion of a multiturn scanning board 7 illustrated in FIG. 1, illustrating a sensor device which is assigned to one of the three gear units of reduction ratio 5.

FIG. 3 illustrates a graduation structure which is connected to one gear wheel, assigned to detecting device 6, of one of the three gear units.

Graduation structure TS illustrated in FIG. 2 is positioned on a circular multiturn graduation board 50 which is connected to a corresponding gear wheel of a gear unit of reduction gear 5. Graduation board 50 may be made of an epoxy material and has a graduation track 40 composed of a first semicircular graduation region $T_L$ having electrically conductive material and a second semicircular graduation region $T_N$ of electrically non-conductive material. The material of the electrically conductive subsection $T_L$ may be made of a copper coating of the epoxy material of graduation board 50, while non-conductive graduation region $T_N$ is not coated and is thus identical to the material of graduation board 50.

From the scanning of graduation track 40 using scanning device 6 elucidated in the following on the basis of FIG. 3, absolute positional information is obtained within one rotation of graduation board 50.

Adjacent to graduation track 40 illustrated in FIG. 3, a second graduation track 41 composed of a multiplicity of height gradations or electrically conductive graduation regions 41c, as well as of recesses or electrically non-conductive graduation regions 41n placed therebetween, may be optionally positioned on graduation board 50, both graduation regions being able to be formed, in terms of material, similarly to graduation regions $T_L$ and $T_N$ illustrated in FIG. 2. From the scanning of this second graduation track, an incremental signal may be acquired which, in conjunction with the absolute positional determination via graduation track 40, allows a high-resolution angle-of-rotation determination.

Multiturn scanning device 6 illustrated in FIG. 3 includes a device having two exciter elements $EW_1$, $EW_2$ for generating a homogeneous electromagnetic excitation field, as well as a sensor track 63 which is assigned to graduation track 40 illustrated in FIG. 2 and which has a circular form and is positioned, together with exciter elements $EW_1$, $EW_2$, on the multiturn scanning board 7.

Exciter elements $EW_1$, $EW_2$ may generate the most homogeneous possible electromagnetic excitation field in a region of a sensor track 63 and are configured as conductor tracks 61, 62 which each include a plurality of plane-parallel, current-carrying conductor tracks positioned on multiturn scanning board 7. If the conductor tracks of an exciter element $EW_1$, $EW_2$ are traversed by current in the same direction, then an electromagnetic field having a tubular or cylindrical orientation, which has field lines that extend in the form of concentric circles about printed conductors 61, 62, and forms around each exciter element $EW_1$, $EW_2$. If exciter elements $EW_1$, $EW_2$ bordering on sensor track 63 are selected to have opposite current directions, then the field lines have an identical orientation in the area of sensor track 63. Conductor tracks 61, 62 of exciter elements $EW_1$, $EW_2$ are supplied via a supply-voltage tap $U_E$.

Sensor track 63 assigned to graduation track 40 includes two planar sensor windings $SW_A$ and $SW_B$ which each supply one single signal period over the periphery of sensor track 63 during scanning. The two sensor windings $SW_A$ and $SW_B$ are offset relatively to one another on multiturn scanning board 7, so that, on the output side, in response to the scanning of the graduation structure TS illustrated in FIG. 2, two sinusoidal output signals A and B result, which exhibit a 90° phase shift from one another. Both output signals A and B provide a unique, absolute position signal within one rotation of the particular gear unit of reduction gear 5 illustrated in FIG. 1 and, thus, a signal for a predefined multiple of the rotations of rotating shaft 2. By evaluating the 90° phase-displaced signals A and B, a detection of directions may also be ensured during the rotary motion.

If, in addition to the two semicircular graduation regions $T_L$ and $T_N$, graduation structure TS illustrated in FIG. 2 is provided with a second graduation track having a multiplicity of electrically conductive graduation regions and electrically non-conductive graduation regions positioned therebetween, then for a high-resolution angle-of-rotation determination of this second graduation track, a circularly formed, further sensor track is provided which is concentrically placed with respect to sensor track 63 and which has two planar sensor windings, between which a relative offset is provided, so that, on the output side, two 90° phase-displaced scanning signals result.

A multiturn detector which has two graduation tracks as well as two sensor tracks and which is suited for high-resolution angle-of-rotation determination, may be configured analogously to the scanning device described in German Published Patent Application No. 197 51 853 for a position transducer.

The output signals from single-turn detector 3 and multiturn detector 4 are transmitted to an evaluation unit 9 positioned on an evaluation board. The evaluation unit determines both the absolute angular position of rotating shaft 2 illustrated in FIG. 1 within one shaft rotation, as well as the number of executed shaft rotations, and sends the information to a display device and/or follow-up electronics.

In the example embodiment of angle measuring instrument 1 illustrated in FIG. 1, an additional scanning board 7 is provided for multiturn detector 4 and is positioned, together with reduction gear 5 on one side of evaluation unit 9 which has a single-turn detector 3 positioned on the other side, including single-turn graduation device 30 and single-turn scanning device 31.

Figure 4:
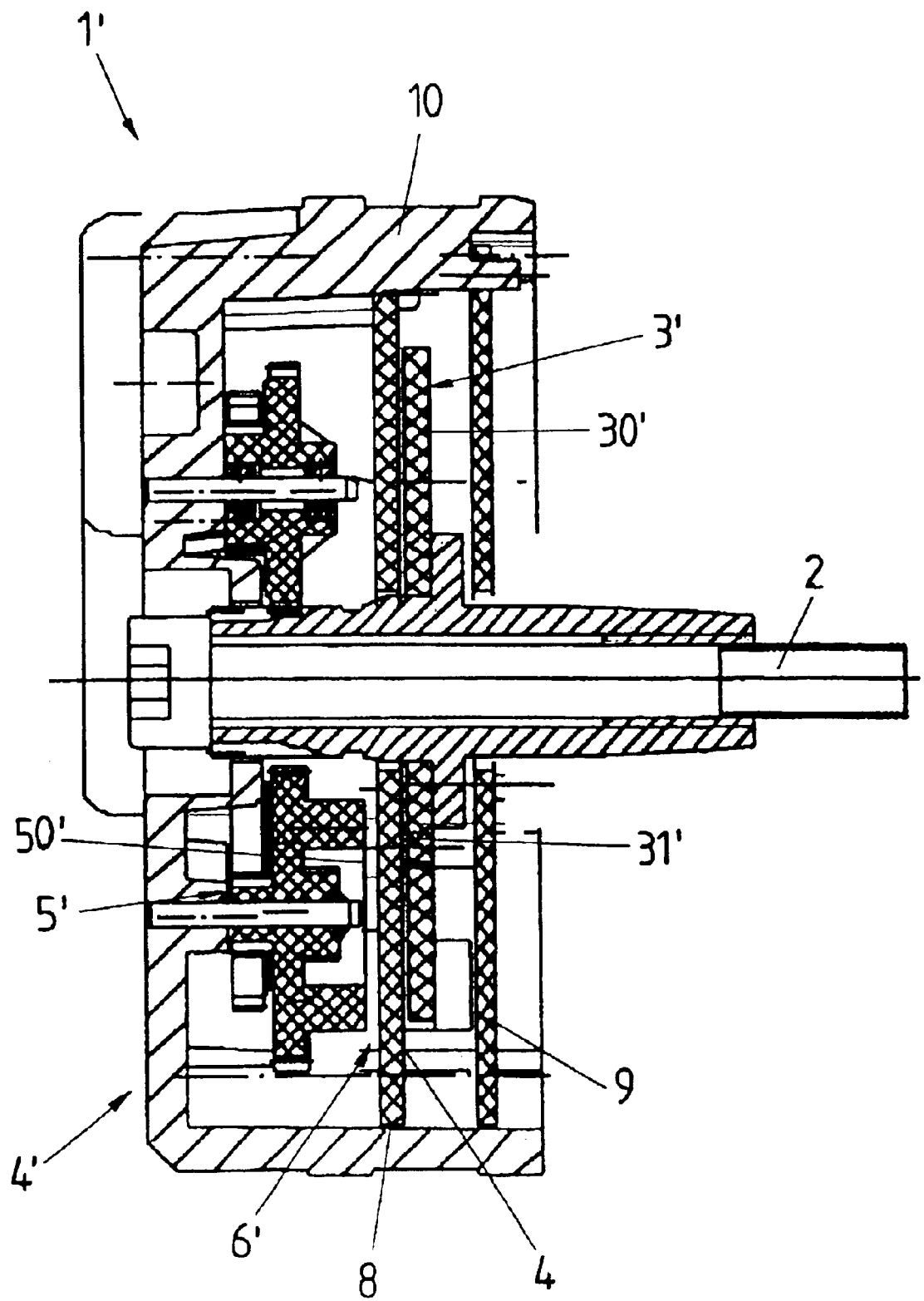
FIG. 4 is a cross-sectional view through an angle measuring instrument including single-turn and multiturn scanning devices positioned on a common scanning board.

FIG. 4 illustrates an angle measuring instrument 1', which, analogously to the example embodiment of an angle measuring instrument 1 illustrated in FIG. 1, includes a measuring-unit housing 10, into which a rotating shaft 2 extends. Rotating shaft 2 is connected to a single-turn graduation device 30' and to a single-turn scanning device 31', as well as to a reduction gear 5' which has a plurality of gear units, which each have an assigned graduation structure positioned on a graduation board 50'.

In contrast to the refinement of angle measuring instrument 1 illustrated in FIG. 1, however, in the exemplary embodiment of angle measuring instrument 1' illustrated in FIG. 4, single-turn scanning device 31', together with multiturn-scanning device 6', are positioned on a common scanning board 8, single-turn scanning device 31' being mounted on the side of single-turn graduation device or board 30' and multiturn scanning device 6' being mounted on the side of reduction gear 5'. In this exemplary embodiment, evaluation board, including evaluation unit 9 mounted thereon, is not positioned between single-turn scanning device 31' and multi-turn scanning device 6', but rather in the area of the housing opening of measuring-unit housing 10. This configuration allows for a one-time contacting between the evaluation board and the scanning board 8 supporting the single-turn and multiturn scanning devices 31', 6'.

Figure 5:
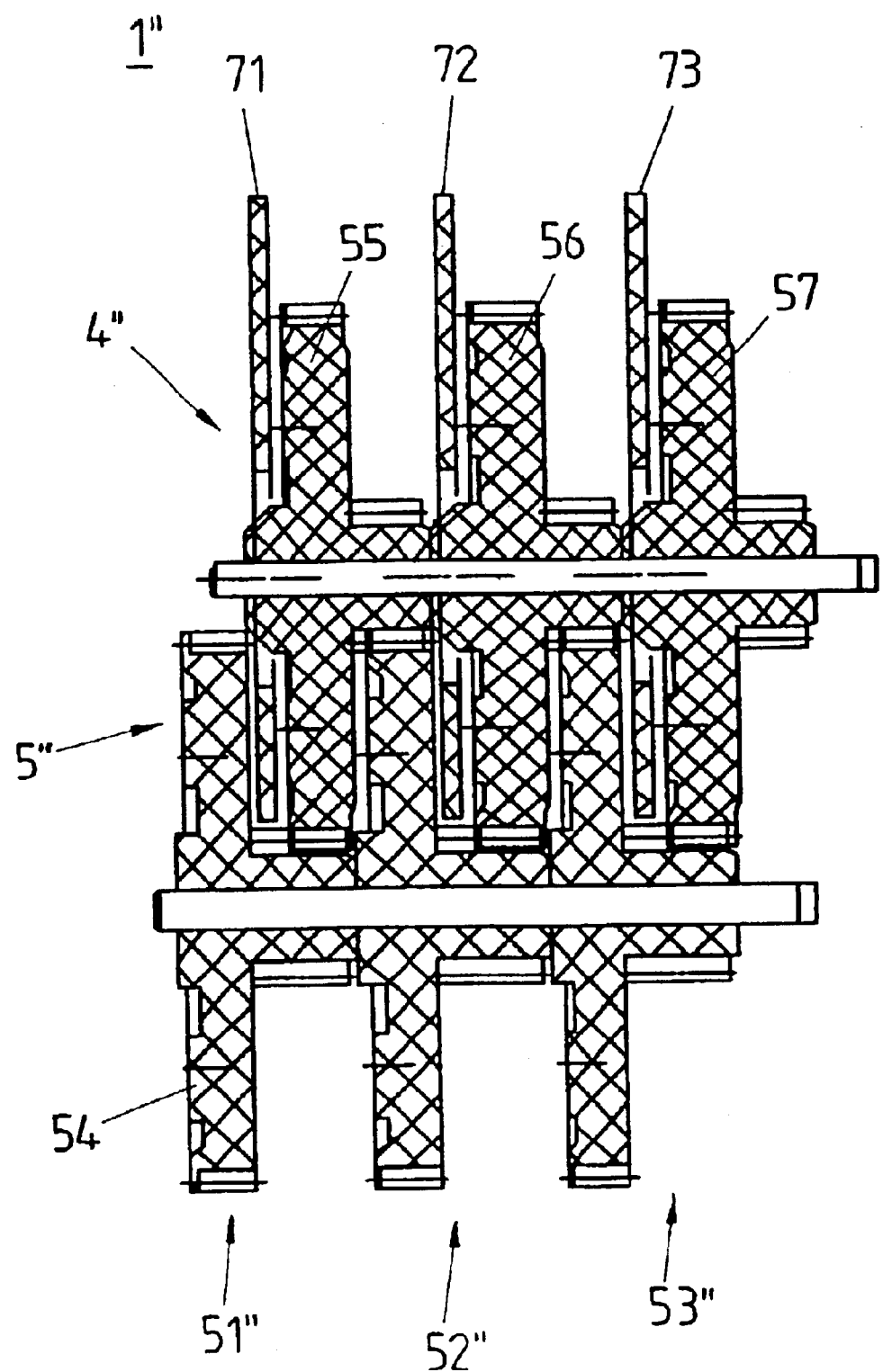
FIG. 5 a cross-sectional view through a reduction gear, including an axial configuration of three gear units.

Alternatively to angle measuring instruments 1 and 1' illustrated on the basis of FIGS. 1 through 4, an angle measuring instrument 1" illustrated in FIG. 5 may be provided with a multiturn detecting device 4", where the gear wheels of reduction gear 5" are in an axially stepped configuration, so that a greater axial length of multiturn scanning device 4" and thus of angle measuring instrument 9" is given, but with a smaller diameter than angle measuring instruments 1 and 1' previously illustrated and described in FIGS. 1 and 4.

In this exemplary embodiment of an angle measuring instrument 1", reduction gear 5" has three gear units 51", 52" and 53", which subdivide the rotations of rotating shaft 2 illustrated in FIG. 1, in each unit, for example, 16 times and thus represent 4,096 rotations. An input gear wheel 54 of first gear unit 51" is coupled, for example, to a gear wheel connected to rotating shaft 2 illustrated in FIG. 1, and transfers the shaft rotation via a gear wheel axially connected to it having a smaller diameter, to a detection gear wheel 55 of first gear unit 51", in which rotational movements are transferred, in turn, via intermeshing gear wheels of second gear unit 52" to a detection gear wheel 56 of second gear unit 52". The rotational movements of detection gear wheel 56 of second gear unit 52" are transferred via intermeshing gear wheels to a detection gear wheel 57 of third gear unit 53".

Assigned to each detecting gear wheel 55, 56, 57 of the three gear units 51", 52", 53" is a graduation structure and an inductive multiturn scanning device having scanning boards 71, 72, 73 with 90° phase-displaced sensor signals, as described above, which supply corresponding sine and cosine signals. Thus, for each gear unit 51", 52" and 53", the angular information pertaining to each reduction step is obtainable by performing an arctan calculation.

In this configuration of angle measuring instrument 9" as well, to enhance accuracy and provide a high-resolution angle-of-rotation determination, an incremental track for fine graduation may also be assigned to each gear unit 51", 52" and 53".

In all three above described example embodiments of angle measuring instruments 1, 1', 1", the scale-graduation structure may be configured as a passive, copper-coated board, as a structurally patterned metal disk, or as a partially metallized plastic part, which is connected to the detecting gear wheel in question of the individual gear units or is formed on the detecting gear wheels of the gear units. The graduation or dimensional embodiment may be fabricated using the two-component injection-molding process, the injection-molding process including inserts, or by coating a substructure. The substructure may also be made completely of metal or of conductive plastic and form the graduation as the result of height gradations, holes, hole patterns, etc.

If, in accordance with previously described exemplary embodiments of angle measuring instruments, multiturn scanning device 4, 4', 4" is combined within one measuring-unit housing with a single-turn detecting device which is based on the principle of an inductive scanning, then in one exemplary embodiment of the present invention, different carrier frequencies are applied to the single-turn scanning device and the multiturn scanning device to prevent an unwanted mutual influencing of the scanning devices which are encapsulated in a measuring-unit housing. The difference between the carrier frequencies may be such that the mutual influences are negligible following a suitable band-pass filtering.

The exciter elements and sensor windings may be accommodated in a spatial form directly in a plastic gear housing of the measuring unit housing, in which context the graduation may be configured in a circular or cylindrical form. In the case of a cylindrical construction of the graduation (drum division), the scanning is no longer sensitive to the distance between the graduation structure and the scanning structure, as occurs in the case of a planar graduation. In the case of a cylindrical scanning structure, a flexible conductor, which bears the excitation and sensor tracks, may be adhesively attached in a drum shape to the plastic housing of the measuring-unit housing.

Figure 7A:
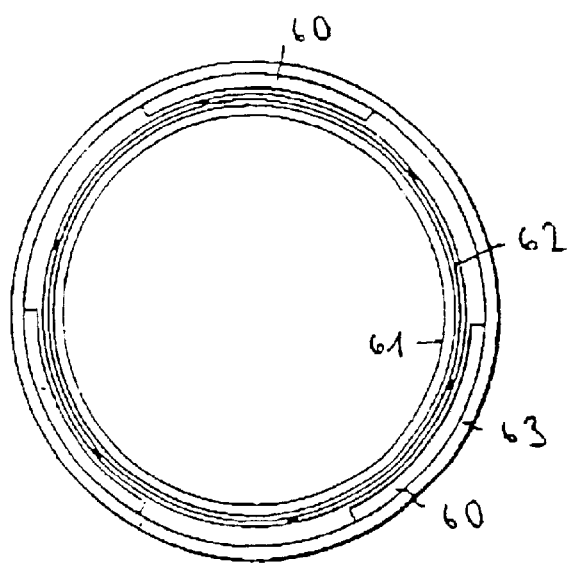
FIGS. 7a, 7b and 7c are schematic views of drum configurations.
Figure 7B:
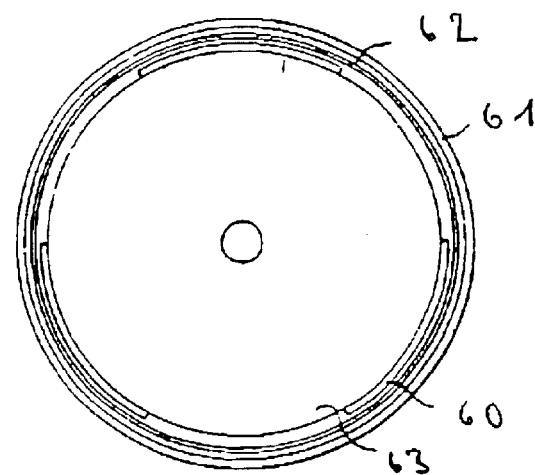
Figure 7C:
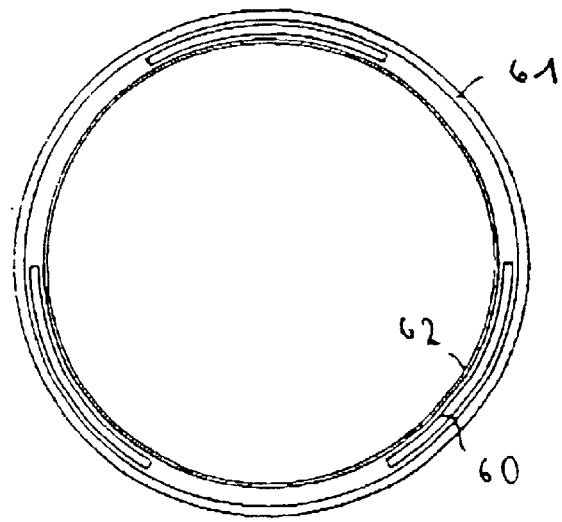

FIGS. 7a, 7b and 7c schematically illustrate drum configurations in which the graduation is relatively rotatable with respect to the excitation and sensor devices. FIGS. 7a, 7b and 7c illustrate the graduation structure 60, the excitation device 61, the sensor device 62 and the rotor 63. Reference is also made to U.S. Pat. No. 4,737,698, which is expressly incorporated herein in its entirety by reference thereto.

Figure 6:
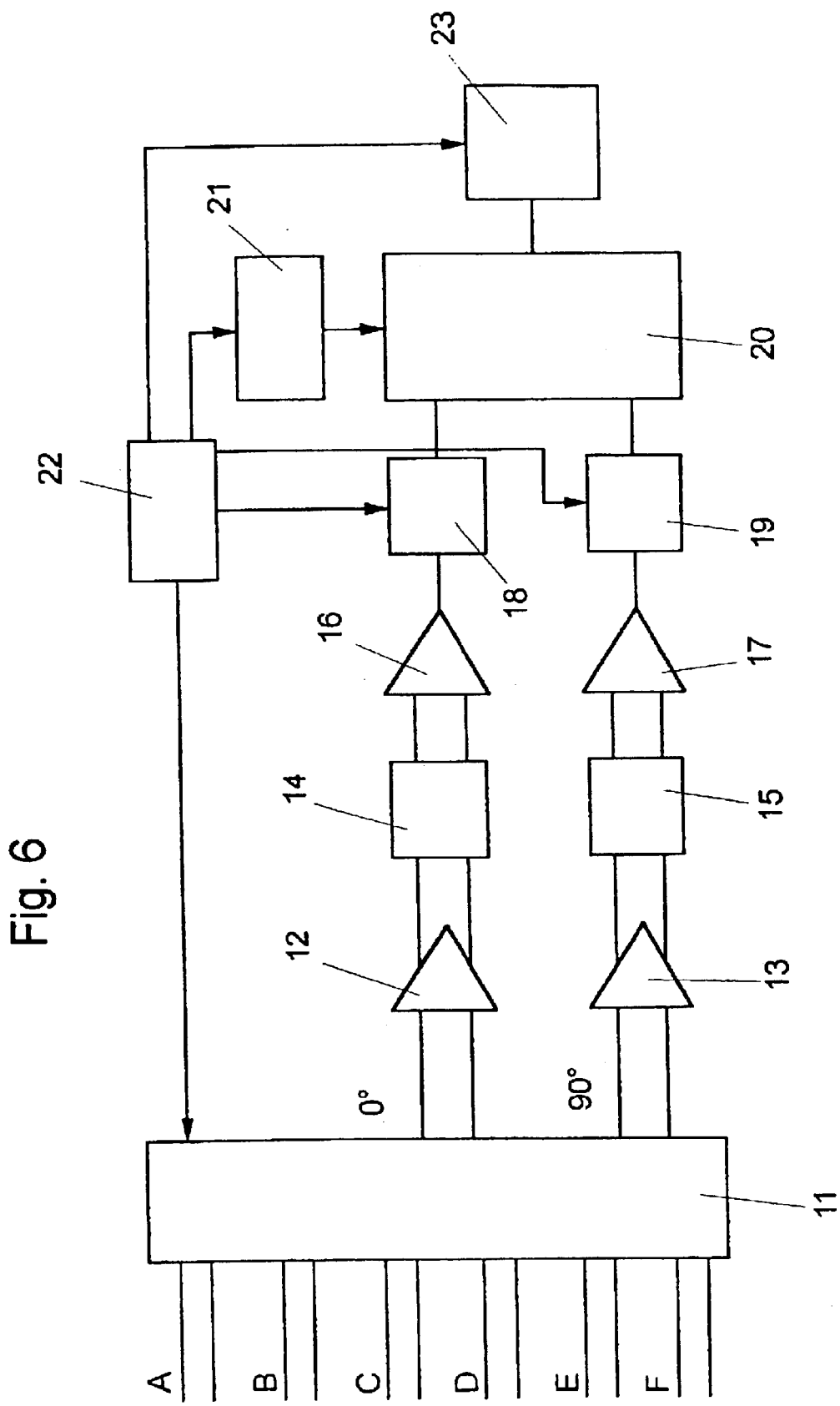
FIG. 6 is a block diagram of a multiturn evaluation unit.

FIG. 6 illustrates a block diagram of an evaluation unit for a multiturn detecting device having threefold reduction of the rotations of rotating shaft 2 illustrated in FIG. 1, i.e., for a multiturn detecting device having three gear units.

Since it is not necessary to provide an evaluation unit for each gear unit, in this exemplary embodiment, the individual gear units are analyzed in sequence via a multiplex device 11 of the same electronics, a secure interlinking or assignment of the tracks may be ensured, given a calculation time of approximately 50 $\mu$s for each graduation and sensor track and a maximal rotational speed of the rotating shaft of 12,000 rotations per minute, the tracks, for example, being reduced in the ratio of $\frac{1}{16}$, even if the measured values are not acquired for all tracks at the same time.

In the exemplary embodiment illustrated in FIG. 6, the 90° phase-offset sensor tracks A through F of the individual sensor tracks, i.e., the outputs of sensor windings $SW_A$ and $SW_B$ illustrated in FIG. 3 are linked to the inputs of multiplex device 11, which, on the output side, transmit a 0° signal and a 90° signal to downstream high-frequency amplifiers 12, 13. High-frequency amplifiers 12, 13 are connected to demodulators 14, 15, respectively, which are connected, in turn, on the output side to the inputs of two low-frequency amplifiers 16, 17. The output signals of low-frequency amplifiers 16, 17 are applied to inputs of an analog/digital converter 18, 19, respectively, which, for example, undertake an 8-bit analog/digital conversion and, on the output side, transmit 0° and 90° analog signals to a device 20 for calculating positional values.

In device 20 for calculating positional values, an arctan calculation and an angle-error correction are performed from the two 90° phase-offset sensor signals A through F (sine and cosine signals). A fine signal adjustment or a signal correction may be alternatively performed in order to obtain sufficiently accurate multiturn signals.

In the exemplary embodiment illustrated in FIG. 6, device 20 for calculating positional values is linked to a correction-value device 21, which contains a table of correction values which is stored, for example, in an EPROM and includes correction values which are considered in the angle calculation for the particular gear unit. In this context, the correction values may be acquired during the adjustment or compensation from a relevant signal analysis, without the use of a reference-measurement system.

The output of device 20 for calculating positional values is linked to an output element 23, which constitutes an interface to a display device or to a follow-up electronics and, for example, transmits the output signals in a 15-bit gray code. A timer logic 22 controls the multiplex scanning through channel selection and is linked to multiplex device 11, to analog/digital converters 18, 19, correction-value device 21 and output element 23.

The individual components of the evaluation device illustrated in FIG. 6 may be combined in an application-specific, integrated circuit, a so-called ASIC or gate array, which is made up of a non-specific accumulation of logic gates having basic cells (gates) and wiring channels disposed therebetween (channeled gate array technique) to which a level is added to connect the gates for the specific function of the evaluation unit. In this manner, the previously described multiturn detecting device 4, 4', 4", which is based on an inductive scanning principle, may be connected to a single-turn scanning device, which is either based on an inductive scanning principle or on an opto-electronic or magneto-resistive scanning principle.

Although the exemplary embodiments illustrated in the drawings and described above relate to an angle measuring instrument having a multiturn rotary position transducer which functions in accordance with the inductive scanning principle, the approach according to the present invention is applicable to a multiturn scanning device which functions in accordance with the capacitive scanning principle.

| Reference Symbol List | |
| --- | --- |
| 1, 1', 1" | angle measuring instrument |
| 2 | rotating shaft |
| 3, 3' | single-turn detecting device (single-turn rotary position transducer) |
| 30 | single-turn graduation device (graduation board) |
| 31 | single-turn scanning device (scanning board) |
| 4, 4', 4" | multiturn detecting device (multiturn rotary position transducer) |
| 41 | graduation tracks |
| 41c | height gradations or electrically conductive graduation regions |
| 41n | recesses or electrically non-conductive graduation regions |
| 5, 5', 5" | reduction gear |
| 50, 50' | multiturn graduation board |
| 51',52 ',53' | 1st, 2nd, 3rd gear unit |
| 54 | input gear wheel |
| 55, 56, 57 | detecting gear wheel |
| 6, 6' | multiturn scanning |
| 61, 62 | conductor track |
| 63, 80 | sensor tracks |
| 7 | multiturn scanning board |
| 71, 72, 73 | scanning boards |
| 8 | multiturn/single-turn scanning board |
| 9 | evaluation unit |
| 10 | measuring unit housing |
| 11 | multiplex device |
| 12, 13 | high-frequency amplifier |
| 14, 15 | demodulator |
| 16, 17 | low-frequency amplifier |
| 18, 19 | analog/digital converter |
| 20 | device for positional value calculation |
| 21 | correction-value device |
| 22 | timer logic |
| 23 | output element |
| 60 | graduation structure |
| 61 | excitation device |
| 62 | sensor device |
| 63 | rotor |
| A–F | sensor signals |
| $EW_{1,2,3}$ | exciter elements |

-continued

| Reference Symbol List | |
| --- | --- |
| $SW_{A,B,C,D}$ | sensor winding |
| AS | scanning structure |
| TS | graduation structure |
| $T_{L,N}$ | electrically conductive (non-conductive) graduation region |

What is claimed is:

1. An angle measuring instrument, comprising:
a first device configured to determine an absolute angular position of a rotating shaft within one shaft rotation; and
a second device configured to determine a number of executed shaft rotations having:
a gear including at least one gear unit configured to convert rotary motion of the shaft into a rotary motion having a defined reduced ratio, the gear unit including at least one gear wheel configured to rotate in a defined ratio to the rotary motion of the shaft; and
a detecting device configured to generate sensor signals positionally dependent and dependent upon the number of executed shaft rotations, the detecting device configured to scan reduced rotational movements of the shaft, said detecting device including;
a graduation structure having alternating electrically conductive and electrically non-conductive graduation regions; and
a scanning device movable relatively to the graduation structure, said scanning device including:
an excitation device configured to generate an electromagnetic excitation field; and
a sensor device configured to scan the graduation structure and to transmit the sensor signals dependent upon the number of executed shaft rotations.

2. The angle measuring instrument according to claim 1, wherein the detecting device is configured to scan the reduced rotational movements of the shaft one of inductively and capacitively.

3. The angle measuring instrument according to claim 1, wherein the sensor device includes at least one sensor track having at least two sensor windings phase-shifted with respect to one another and configured to emit phase-offset, periodically modulated sensor signals in response to a relative motion between the scanning device and the graduation structure, the excitation device including exciter elements positioned on both sides of the at least one sensor track configured to produce a most homogeneous possible configuration of the electromagnetic field in a region of the sensor track.

4. The angle measuring instrument according to claim 3, wherein the exciter elements include one of a current-carrying conductor track and a plurality of current-carrying conductor tracks arranged in parallel to one another, wherein the conductor tracks of the exciter elements are interconnected such that current flow is oriented in opposite directions in the conductor tracks positioned on both sides of the sensor track.

5. The angle measuring instrument according to claim 3, wherein the graduation structure is arranged on a circular graduation board and includes a first, circularly formed graduation track including an electrically conductive circular segment and an electrically non-conductive circular segment, the scanning device including a scanning structure positioned on a circular scanning board, a sensor device of which includes the sensor track assigned to the graduation track, the sensor windings of the sensor track configured to determine an absolute position over a detectable measuring range.

6. The angle measuring instrument according to claim 5, wherein the graduation structure includes a second circularly formed graduation track radially adjacent to the first graduation track and formed as a periodic sequence of a plurality of electrically conductive graduation regions and electrically non-conductive graduation regions, the scanning device including a scanning structure, a sensor device of which includes a second sensor track assigned to the second graduation track and a sensor winding of which is configured to enable an additional, incremental positional determination.

7. The angle measuring instrument according to claim 5, wherein the graduation structure is formed on one of a copper-coated graduation board, a structurally patterned metal disk, a partially metallized plastic part and a metallized gear wheel.

8. The angle measuring instrument according to claim 7, wherein the graduation structure is fabricated by one of a two-component injection-molding process including inserts and by coating a substructure.

9. The angle measuring instrument according to claim 8, wherein the graduation structure includes one of a metallic material and of a conductive plastic, and the graduation structure is formed by one of height gradations and recesses.

10. The angle measuring instrument according to claim 3, wherein the detecting device configured to determine the number of executed shaft rotations has a plurality of gear units for a defined reduction of the rotational movements of the shaft, the exciter elements configured to receive excitation signals assigned to the gear units and modulated to a carrier frequency, and the exciter elements configured to be fed excitation signals modulated to a carrier frequency which differs by the carrier frequency that is applied to the exciter elements.

11. The angle measuring instrument according to claim 10, wherein the exciter elements assigned to the gear units are fed by a common exciter resonant circuit.

12. The angle measuring instrument according to claim 11, wherein the scanning devices of individual gear units are connected via a multiplex device to a common evaluation unit.

13. The angle measuring instrument according to claim 1, wherein the first device configured to determine the absolute angular position of the rotating shaft within one shaft rotation includes:
  a detecting device having a graduation structure positioned on a graduation device; and
  a scanning device mounted on a scanning board configured to transmit the sensor signals which are dependent upon the absolute angular position of the rotating shaft within one shaft rotation, the output signals of the detecting device configured to determine the absolute angular position of the rotating shaft within one shaft rotation, and the sensor signals of the detecting device configured to determine a number of executed shaft rotations transmittable to an evaluation unit.

14. The angle measuring instrument according to claim 13, wherein the graduation device and the scanning device of the first device configured to determine the absolute angular position of the rotating shaft within one shaft rotation and the evaluation unit are positioned coaxially with respect to the shaft.

15. The angle measuring instrument according to claim 14, wherein the graduation device and the scanning device of the first device configured to determine the absolute angular position of the rotating shaft within one shaft rotation are positioned on one side of the evaluation unit, and the graduation device and the scanning device of the second device configured to determine the number of executed shaft rotations on another side of the evaluation unit.

16. The angle measuring instrument according to claim 14, wherein the scanning device of the first device configured to determine the absolute angular position of the rotating shaft within one shaft rotation and the scanning device of the second device configured to determine the number of executed shaft rotations on both sides of a common scanning board are positioned opposite to a particular graduation devices assigned to the scanning devices.

17. The angle measuring instrument according to claim 1, wherein the graduation structure is arranged on a peripheral surface of a cylindrical member and includes a first graduation track including an electrically conductive and an electrically non-conductive peripheral cylinder section, the scanning device includes a scanning structure arranged on a cylindrical housing and has a sensor device having a sensor track assigned to the graduation structure and sensor windings wound on the peripheral cylinder surface are configured to enable an absolute positional determination over a detectable measuring range.

18. The angle measuring instrument according to claim 17, wherein the graduation structure has a second graduation track axially adjacent to the first graduation track and formed as a periodic sequence of a plurality of electrically conductive graduation regions and electrically non-conductive graduation regions and the scanning device includes a scanning structure positioned on the cylindrical housing, the sensor device including a second sensor track assigned to the graduation structure and the sensor windings wound on the peripheral cylinder surface configured to enable an additional incremental positional determination.

19. The angle measuring instrument according to claim 17 wherein the graduation structure is formed on one of a copper-coated cylindrical member, a structurally patterned metal cylinder, and on a surface and peripheral area of a partially metallized plastic part on a metallized gear wheel.

20. The angle measuring instrument according to claim 17, wherein the sensor windings are arranged on a flexible conductor secured to the peripheral surface of the cylindrical housing, radially encircling the housing.

21. The angle measuring instrument according to claim 19, wherein the graduation structure is fabricated by one of a two-component injection-molding process including inserts and by coating a substructure.

22. The angle measuring instrument according to claim 21, wherein the graduation structure includes one of a metallic material and of a conductive plastic, and the graduation structure is formed by one of height gradations and recesses.

23. An angle measuring instrument comprising:
  a first device configured to determine an absolute angular position of a rotating shaft within one shaft rotation; and
  a second device configured to determine a number of executed shaft rotations having:
    a gear including at least one gear unit configured to convert rotary motion of the shaft into a rotary motion having a defined reduced ratio, the gear unit including at least one gear wheel configured to rotate in a defined ratio to the rotary motion of the shaft; and a detecting device configured to generate sensor signals positionally dependent and dependent upon the number of executed shaft rotations, the detecting device configured to scan reduced rotational movements of the shaft, said detecting device including:
  a graduation structure having alternating electrically conductive and electrically non-conductive graduation regions; and
  a scanning device movable relatively to the graduation structure, said scanning device including:
    an excitation device configured to generate an electromagnetic excitation field; and
    a sensor device configured to scan the graduation structure and to transmit the sensor signals dependent upon the number of executed shaft rotations,
  wherein the sensor device includes at least one sensor track having at least two sensor windings phase-shifted with respect to one another and configured to emit phase-offset, periodically modulated sensor signals in response to a relative motion between the scanning device and the graduation structure, the excitation device including exciter elements positioned on both sides of the at least one sensor track configured to produce a most homogeneous possible configuration of the electromagnetic field in a region of the sensor track,
  wherein the detecting device configured to determine the number of executed shaft rotations has a plurality of gear units for a defined reduction of the rotational movements of the shaft, the exciter elements configured to receive excitation signals assigned to the gear units and modulated to a carrier frequency, and the exciter elements configured to be fed excitation signals modulated to a carrier frequency which differs by the carrier frequency that is applied to the exciter elements,
  wherein the exciter elements assigned to the gear units are fed by a common exciter resonant circuit,
  wherein the scanning devices of individual gear units are connected via a multiplex device to a common evaluation unit,
  wherein the scanning devices assigned to the gear units are configured to amplify, filter and demodulate two high-frequency modulated sensor signals which are 90° out-of-phase, the measuring instrument further comprising a device configured to receive amplified low-frequency sensor signals sent via an analog/digital converter, configured to calculate positional values and configured to send an encoded output signal to at least one of a display device and follow-up electronics.

24. The angle measuring instrument according to claim 23, wherein the device configured to calculate positional values is configured to undertake an adjustment using a table of correction values.

25. The angle measuring instrument according to claim 23, wherein the multiplex device, the analog/digital converter, a device configured to store a table of correction values, and at least one of the display device and the follow-up electronics are configured to receive a clock-pulse signal transmitted by a clock-pulse generator.

26. An angle measuring instrument, comprising:
a first device configured to determine an absolute angular position of a rotating shaft within one shaft rotation; and a second device configured to determine a number of executed shaft rotations having:
  a gear including at least one gear unit configured to convert rotary motion of the shaft into a rotary motion having a defined reduced ratio, the gear unit including at least one gear wheel configured to rotate in a defined ratio to the rotary motion of the shaft; and
  a detecting device configured to generate sensor signals positionally dependent and dependent upon the number of executed shaft rotations, the detecting device configured to scan reduced rotational movements of the shaft, said detecting device including;
    a graduation structure having alternating electrically conductive and electrically non-conductive graduation regions; and
    a scanning device movable relatively to the graduation structure, said scanning device including:
      an excitation device configured to generate an electromagnetic excitation field; and
      a sensor device configured to scan the graduation structure and to transmit the sensor signals dependent upon the number of executed shaft rotations;
  wherein said first device and said second device being positioned on both sides of a common board.

27. The angle measuring instrument according to claim 26, wherein the sensor device includes at least one sensor track having at least two sensor windings phase-shifted with respect to one another and configured to emit phase-offset, periodically modulated sensor signals in response to a relative motion between the scanning device and the graduation structure, the excitation device including exciter elements positioned on both sides of the at least one sensor track configured to produce a most homogeneous possible configuration of the electromagnetic field in a region of the sensor track.

28. The angle measuring instrument according to claim 27, wherein the graduation structure is arranged on a circular graduation board and includes a first, circularly formed graduation track including an electrically conductive circular segment and an electrically non-conductive circular segment, the scanning device including a scanning structure positioned on a circular scanning board, a sensor device of which includes the sensor track assigned to the graduation track, the sensor windings of the sensor track configured to determine an absolute position over a detectable measuring range.

29. The angle measuring instrument according to claim 28, wherein the graduation structure includes a second circularly formed graduation track radially adjacent to the first graduation track and formed as a periodic sequence of a plurality of electrically conductive graduation regions and electrically non-conductive graduation regions, the scanning device including a scanning structure, a sensor device of which includes a second sensor track assigned to the second graduation track and a sensor winding of which is configured to enable an additional, incremental positional determination.

30. The angle measuring instrument according to claim 28, wherein the graduation structure is formed on one of a copper-coated graduation board, a structurally patterned metal disk, a partially metallized plastic part and a metallized gear wheel.

31. The angle measuring instrument according to claim 27, wherein the detecting device configured to determine the number of executed shaft rotations has a plurality of gear units for a defined reduction of the rotational movements of the shaft, the exciter elements configured to receive excitation signals assigned to the gear units and modulated to a carrier frequency, and the exciter elements configured to be fed excitation signals modulated to a carrier frequency which differs by the carrier frequency that is applied to the exciter elements.

32. The angle measuring instrument according to claim 31 wherein the exciter elements assigned to the gear units are fed by a common exciter resonant circuit.

33. The angle measuring instrument according to claim 32, wherein the scanning devices of individual gear units are connected via a multiplex device to a common evaluation unit.

34. The angle measuring instrument according to claim 33, wherein the scanning devices assigned to the gear units are configured to amplify, filter and demodulate two high-frequency modulated sensor signals which are 90 out-of-phase, the measuring instrument further comprising a device configured to receive amplified low-frequency sensor signals sent via an analog/digital converter, configured to calculate positional values and configured to send an encoded output signal to at least one of a display device and follow-up electronics.

35. The angle measuring instrument according to claim 34, wherein the device configured to calculate positional values is configured to undertake an adjustment using a table of correction values.

36. The angle measuring instrument according to claim 34, wherein the multiplex device, the analog/digital converter, a device configured to store a table of correction values, and at least one of the display device and the follow-up electronics are configured to receive a clock-pulse signal transmitted by a clock-pulse generator.

37. The angle measuring instrument according to claim 26, wherein the first device configured to determine the absolute angular position of the rotating shaft within one shaft rotation includes:
  a detecting device having a graduation structure positioned on a graduation device; and
  a scanning device mounted on a scanning board configured to transmit the sensor signals which are dependent upon the absolute angular position of the rotating shaft within one shaft rotation, the output signals of the detecting device configured to determine the absolute angular position of the rotating shaft within one shaft rotation, and the sensor signals of the detecting device configured to determine a number of executed shaft rotations transmittable to an evaluation unit.

38. An angle measuring instrument, comprising:
a first device configured to determine an absolute angular position of a rotating shaft within one shaft rotation; and
a second device configured to determine a number of executed shaft rotations having:
  a gear including at least one gear unit configured to convert rotary motion of the shaft into a rotary motion having a defined reduced ratio, the gear unit including at least one gear wheel configured to rotate in a defined ratio to the rotary motion of the shaft; and
  a detecting device configured to generate sensor signals positionally dependent and dependent upon the number of executed shaft rotations, the detecting device configured to scan reduced rotational movements of the shaft, said detecting device including;
    a graduation structure having alternating electrically conductive and electrically non-conductive graduation regions; and
    a scanning device movable relatively to the graduation structure, said scanning device including:
      an excitation device configured to generate an electromagnetic excitation field; and
      a sensor device configured to scan the graduation structure and to transmit the sensor signals dependent upon the number of executed shaft rotations;
    wherein signals generated by said first device and said second device being transmitted to an evaluation unit and said evaluation unit being integrated in an integrated circuit.

39. The angle measuring instrument according to claim 38, wherein the sensor device includes at least one sensor track having at least two sensor windings phase-shifted with respect to one another and configured to emit phase-offset, periodically modulated sensor signals in response to a relative motion between the scanning device and the graduation structure, the excitation device including exciter elements positioned on both sides of the at least one sensor track configured to produce a most homogeneous possible configuration of the electromagnetic field in a region of the sensor track.

40. The angle measuring instrument according to claim 39, wherein the graduation structure is arranged on a circular graduation board and includes a first, circularly formed graduation track including an electrically conductive circular segment and an electrically non-conductive circular segment, the scanning device including a scanning structure positioned on a circular scanning board, a sensor device of which includes the sensor track assigned to the graduation track, the sensor windings of the sensor track configured to determine an absolute position over a detectable measuring range.

41. The angle measuring instrument according to claim 40, wherein the graduation structure includes a second circularly formed graduation track radially adjacent to the first graduation track and formed as a periodic sequence of a plurality of electrically conductive graduation regions and electrically non-conductive graduation regions, the scanning device including a scanning structure, a sensor device of which includes a second sensor track assigned to the second graduation track and a sensor winding of which is configured to enable an additional, incremental positional determination.

42. The angle measuring instrument according to claim 40, wherein the graduation structure is formed on one of a copper-coated graduation board, a structurally patterned metal disk, a partially metallized plastic part and a metallized gear wheel.

43. The angle measuring instrument according to claim 42, wherein the graduation structure is fabricated by one of a two-component injection-molding process including inserts and by coating a substructure.

44. The angle measuring instrument according to claim 43, wherein the graduation structure includes one of a metallic material and of a conductive plastic, and the graduation structure is formed by one of height gradations and recesses.

45. The angle measuring instrument according to claim 39, wherein the detecting device configured to determine the number of executed shaft rotations has a plurality of gear units for a defined reduction of the rotational movements of the shaft, the exciter elements configured to receive excitation signals assigned to the gear units and modulated to a carrier frequency, and the exciter elements configured to be fed excitation signals modulated to a carrier frequency which differs by the carrier frequency that is applied to the exciter elements.

46. The angle measuring instrument according to claim 45, wherein the exciter elements assigned to the gear units are fed by a common exciter resonant circuit.

47. The angle measuring instrument according to claim 46, wherein the scanning devices of individual gear units are connected via a multiplex device to a common evaluation unit.

48. The angle measuring instrument according to claim 47, wherein the scanning devices assigned to the gear units are configured to amplify, filter and demodulate two high-frequency modulated sensor signals which are 90° out-of-phase, the measuring instrument further comprising a device configured to receive amplified low-frequency sensor signals sent via an analog/digital converter, configured to calculate positional values and configured to send an encoded output signal to at least one of a display device and follow-up electronics.

49. The angle measuring instrument according to claim 48, wherein the device configured to calculate positional values is configured to undertake an adjustment using a table of correction values.

50. The angle measuring instrument according to claim 48, wherein the multiplex device, the analog/digital converter, a device configured to store a table of correction values, and at least one of the display device and the follow-up electronics are configured to receive a clock-pulse signal transmitted by a clock-pulse generator.

51. The angle measuring instrument according to claim 38, wherein the first device configured to determine the absolute angular position of the rotating shaft within one shaft rotation includes:
a detecting device having a graduation structure positioned on a graduation device; and
a scanning device mounted on a scanning board configured to transmit the sensor signals which are dependent upon the absolute angular position of the rotating shaft within one shaft rotation, the output signals of the detecting device configured to determine the absolute angular position of the rotating shaft within one shaft rotation, and the sensor signals of the detecting device configured to determine a number of executed shaft rotations transmittable to an evaluation unit.

52. The angle measuring instrument according to claim 51, wherein the graduation device and the scanning device of the first device configured to determine the absolute angular position of the rotating shaft within one shaft rotation and the evaluation unit are positioned coaxially with respect to the shaft.

53. The angle measuring instrument according to claim 52, wherein the scanning device of the first device configured to determine the absolute angular position of the rotating shaft within one shaft rotation and the scanning device of the second device configured to determine the number of executed shaft rotations on both sides of a common scanning board are positioned opposite to a particular graduation devices assigned to the scanning devices.

54. The angle measuring instrument according to claim 38, wherein the graduation structure is arranged on a peripheral surface of a cylindrical member and includes a first graduation track including an electrically conductive and an electrically non-conductive peripheral cylinder section, the scanning device includes a scanning structure arranged on a cylindrical housing and has a sensor device having a sensor track assigned to the graduation structure and sensor windings wound on the peripheral cylinder surface are configured to enable an absolute positional determination over a detectable measuring range; and
wherein the sensor windings are arranged on a flexible conductor secured to the peripheral surface of the cylindrical housing, radially encircling the housing.

55. An angle measuring instrument, comprising:
a first device configured to determine an absolute angular position of a rotating shaft within one shaft rotation; and
a second device configured to determine a number of executed shaft rotations having:
a gear including at least one gear unit configured to convert rotary motion of the shaft into a rotary motion having a defined reduced ratio, the gear unit including at least one gear wheel configured to rotate in a defined ratio to the rotary motion of the shaft; and
a detecting device configured to generate sensor signals positionally dependent and dependent upon the number of executed shaft rotations, the detecting device configured to scan reduced rotational movements of the shaft, said detecting device including;
a graduation structure having alternating electrically conductive and electrically non-conductive graduation regions; and
a scanning device movable relatively to the graduation structure, said scanning device including:
an excitation device configured to generate an electromagnetic excitation field; and
a sensor device configured to scan the graduation structure and to transmit the sensor signals dependent upon the number of executed shaft rotations;
wherein the graduation structure is formed on one of a copper-coated graduation board, a structurally patterned metal disk, a partially metallized plastic part and a metallized gear wheel.

56. The angle measuring instrument according to claim 55, wherein the sensor device includes at least one sensor track having at least two sensor windings phase-shifted with respect to one another and configured to emit phase-offset, periodically modulated sensor signals in response to a relative motion between the scanning device and the graduation structure, the excitation device including exciter elements positioned on both sides of the at least one sensor track configured to produce a most homogeneous possible configuration of the electromagnetic field in a region of the sensor track.

57. The angle measuring instrument according to claim 56, wherein the graduation structure is arranged on a circular graduation board and includes a first, circularly formed graduation track including an electrically conductive circular segment and an electrically non-conductive circular segment, the scanning device including a scanning structure positioned on a circular scanning board, a sensor device of which includes the sensor track assigned to the graduation track, the sensor windings of the sensor track configured to determine an absolute position over a detectable measuring range.

58. The angle measuring instrument according to claim 57, wherein the graduation structure includes a second circularly formed graduation track radially adjacent to the first graduation track and formed as a periodic sequence of a plurality of electrically conductive graduation regions and electrically non-conductive graduation regions, the scanning device including a scanning structure, a sensor device of which includes a second sensor track assigned to the second graduation track and a sensor winding of which is configured to enable an additional, incremental positional determination.

59. The angle measuring instrument according to claim 57, wherein the graduation structure is formed on one of a copper-coated graduation board, a structurally patterned metal disk, a partially metallized plastic part and a metallized gear wheel, and wherein the graduation structure is fabricated by one of a two-component injection-molding process including inserts and by coating a substructure.

60. The angle measuring instrument according to claim 59, wherein the graduation structure includes one of a metallic material and of a conductive plastic, and the graduation structure is formed by one of height gradations and recesses.

61. The angle measuring instrument according to claim 55, wherein the first device configured to determine the absolute angular position of the rotating shaft within one shaft rotation includes:
   a detecting device having a graduation structure positioned on a graduation device; and
   a scanning device mounted on a scanning board configured to transmit the sensor signals which are dependent upon the absolute angular position of the rotating shaft within one shaft rotation, the output signals of the detecting device configured to determine the absolute angular position of the rotating shaft within one shaft rotation, and the sensor signals of the detecting device configured to determine a number of executed shaft rotations transmittable to an evaluation unit.

62. The angle measuring instrument according to claim 61, wherein the graduation device and the scanning device of the first device configured to determine the absolute angular position of the rotating shaft within one shaft rotation and the evaluation unit are positioned coaxially with respect to the shaft.

63. The angle measuring instrument according to claim 62, wherein the scanning device of the first device configured to determine the absolute angular position of the rotating shaft within one shaft rotation and the scanning device of the second device configured to determine the number of executed shaft rotations on both sides of a common scanning board are positioned opposite to a particular graduation devices assigned to the scanning devices.

64. The angle measuring instrument according to claim 55, wherein the graduation structure is arranged on a peripheral surface of a cylindrical member and includes a first graduation track including an electrically conductive and an electrically non-conductive peripheral cylinder section, the scanning device includes a scanning structure arranged on a cylindrical housing and has a sensor device having a sensor track assigned to the graduation structure and sensor windings wound on the peripheral cylinder surface are configured to enable an absolute positional determination over a detectable measuring range, and
   wherein the sensor windings are arranged on a flexible conductor secured to the peripheral surface of the cylindrical housing, radially encircling the housing.

65. An angle measuring instrument, comprising:
   a first device configured to determine an absolute angular position of a rotating shaft within one shaft rotation; and
   a second device configured to determine a number of executed shaft rotations having:
      a gear including at least one gear unit configured to convert rotary motion of the shaft into a rotary motion having a defined reduced ratio, the gear unit including at least one gear wheel configured to rotate in a defined ratio to the rotary motion of the shaft; and
      a detecting device configured to generate sensor signals positionally dependent and dependent upon the number of executed shaft rotations, the detecting device configured to scan reduced rotational movements of the shaft, said detecting device including;
         a graduation structure having alternating electrically conductive and electrically non-conductive graduation regions; and
         a scanning device movable relatively to the graduation structure, said scanning device including:
            an excitation device configured to generate an electromagnetic excitation field; and
            a sensor device configured to scan the graduation structure and to transmit the sensor signals dependent upon the number of executed shaft rotations;
   wherein the first device configured to determine the absolute angular position of the rotating shaft within one shaft rotation includes:
   a detecting device having a graduation structure positioned on a graduation device; and
   a scanning device mounted on a scanning board configured to transmit the sensor signals which are dependent upon the absolute angular position of the rotating shaft within one shaft rotation, the output signals of the detecting device configured to determine the absolute angular position of the rotating shaft within one shaft rotation, and the sensor signals of the detecting device configured to determine a number of executed shaft rotations transmittable to an evaluation unit;
   wherein the scanning devices assigned to the gear units are configured to amplify, filter and demodulate two high-frequency modulated sensor signals which are 90° out-of-phase, the measuring instrument further comprising a device configured to receive amplified low-frequency sensor signals sent via an analog/digital converter, configured to calculate positional values and configured to send an encoded output signal to at least one of a display device and follow-up electronics; and
   wherein the device configured to calculate positional values is configured to undertake an adjustment using a table of correction values.

66. The angle measuring instrument according to claim 65, wherein the sensor device includes at least one sensor track having at least two sensor windings phase-shifted with respect to one another and configured to emit phase-offset, periodically modulated sensor signals in response to a relative motion between the scanning device and the graduation structure, the excitation device including exciter elements positioned on both sides of the at least one sensor track configured to produce a most homogeneous possible configuration of the electromagnetic field in a region of the sensor track.

67. The angle measuring instrument according to claim 66, wherein the exciter elements include one of a current-carrying conductor track and a plurality of current-carrying conductor tracks arranged in parallel to one another, wherein the conductor tracks of the exciter elements are interconnected such that current flow is oriented in opposite directions in the conductor tracks positioned on both sides of the sensor track.

68. The angle measuring instrument according to claim 66, wherein the graduation structure is arranged on a circular graduation board and includes a first, circularly formed graduation track including an electrically conductive circular segment and an electrically non-conductive circular segment, the scanning device including a scanning structure positioned on a circular scanning board, a sensor device of which includes the sensor track assigned to the graduation track, the sensor windings of the sensor track configured to determine an absolute position over a detectable measuring range.

69. The angle measuring instrument according to claim 68, wherein the graduation structure includes a second circularly formed graduation track radially adjacent to the first graduation track and formed as a periodic sequence of a plurality of electrically conductive graduation regions and electrically non-conductive graduation regions, the scanning device including a scanning structure, a sensor device of which includes a second sensor track assigned to the second graduation track and a sensor winding of which is configured to enable an additional, incremental positional determination.

70. The angle measuring instrument according to claim 68, wherein the graduation structure is formed on one of a copper-coated graduation board, a structurally patterned metal disk, a partially metallized plastic part and a metallized gear wheel.

71. The angle measuring instrument according to claim 70, wherein the graduation structure is fabricated by one of a two-component injection-molding process including inserts and by coating a substructure.

72. The angle measuring instrument according to claim 71, wherein the graduation structure includes one of a metallic material and of a conductive plastic, and the graduation structure is formed by one of height gradations and recesses.

73. The angle measuring instrument according to claim 66, wherein the detecting device configured to determine the number of executed shaft rotations has a plurality of gear units for a defined reduction of the rotational movements of the shaft, the exciter elements configured to receive excitation signals assigned to the gear units and modulated to a carrier frequency, and the exciter elements configured to be fed excitation signals modulated to a carrier frequency which differs by the carrier frequency that is applied to the exciter elements.

74. The angle measuring instrument according to claim 73, wherein the exciter elements assigned to the gear units are fed by a common exciter resonant circuit.

75. The angle measuring instrument according to claim 74, wherein the scanning devices of individual gear units are connected via a multiplex device to a common evaluation unit.

76. The angle measuring instrument according to claim 75, wherein the scanning devices assigned to the gear units are configured to amplify, filter and demodulate two high-frequency modulated sensor signals which are 90° out-of-phase, the measuring instrument further comprising a device configured to receive amplified low-frequency sensor signals sent via an analog/digital converter, configured to calculate positional values and configured to send an encoded output signal to at least one of a display device and follow-up electronics.

77. The angle measuring instrument according to claim 65, wherein the first device configured to determine the absolute angular position of the rotating shaft within one shaft rotation includes:

a detecting device having a graduation structure positioned on a graduation device; and a scanning device mounted on a scanning board configured to transmit the sensor signals which are dependent upon the absolute angular position of the rotating shaft within one shaft rotation, the output signals of the detecting device configured to determine the absolute angular position of the rotating shaft within one shaft rotation, and the sensor signals of the detecting device configured to determine a number of executed shaft rotations transmittable to an evaluation unit; and wherein the graduation device and the scanning device of the first device configured to determine the absolute angular position of the rotating shaft within one shaft rotation and the evaluation unit are positioned coaxially with respect to the shaft.

78. The angle measuring instrument according to claim 77, wherein the scanning device of the first device configured to determine the absolute angular position of the rotating shaft within one shaft rotation and the scanning device of the second device configured to determine the number of executed shaft rotations on both sides of a common scanning board are positioned opposite to a particular graduation devices assigned to the scanning devices.

79. The angle measuring instrument according to claim 65, wherein the graduation structure is arranged on a peripheral surface of a cylindrical member and includes a first graduation track including an electrically conductive and an electrically non-conductive peripheral cylinder section, the scanning device includes a scanning structure arranged on a cylindrical housing and has a sensor device having a sensor track assigned to the graduation structure and sensor windings wound on the peripheral cylinder surface are configured to enable an absolute positional determination over a detectable measuring range; and wherein the sensor windings are arranged on a flexible conductor secured to the peripheral surface of the cylindrical housing, radially encircling the housing.

* * * * *